(12) United States Patent
Nezuka

(10) Patent No.: US 10,054,502 B2
(45) Date of Patent: Aug. 21, 2018

(54) SENSOR DRIVING DEVICE

(71) Applicant: DENSO CORPORATION, Kariya, Aichi-pref. (JP)

(72) Inventor: Tomohiro Nezuka, Kariya (JP)

(73) Assignee: DENSO CORPORATION, Kariya (JP)

(*) Notice: Subject to any disclaimer, the term of this patent is extended or adjusted under 35 U.S.C. 154(b) by 288 days.

(21) Appl. No.: 15/048,014

(22) Filed: Feb. 19, 2016

(65) Prior Publication Data

US 2016/0258826 A1    Sep. 8, 2016

(30) Foreign Application Priority Data

Mar. 3, 2015  (JP) .................................. 2015-41627

(51) Int. Cl.
  *G01L 1/22* (2006.01)
  *G01K 7/20* (2006.01)
  *G01L 9/04* (2006.01)

(52) U.S. Cl.
  CPC .............. *G01L 1/2262* (2013.01); *G01K 7/20* (2013.01); *G01L 9/045* (2013.01)

(58) Field of Classification Search
  CPC .................................................... G01L 1/2262
  See application file for complete search history.

(56) References Cited

U.S. PATENT DOCUMENTS

| 4,366,714 A * | 1/1983 | Adorni ..................... E21B 47/06 |
| | | 374/143 |
| 5,134,885 A * | 8/1992 | Hecht ................... G01L 1/2281 |
| | | 330/256 |
| 5,253,532 A | 10/1993 | Kamens |
| 5,460,049 A * | 10/1995 | Kirsch ..................... G01L 9/065 |
| | | 73/152.52 |
| 6,724,202 B2 * | 4/2004 | Tanizawa ............. G01D 3/0365 |
| | | 324/71.1 |

(Continued)

FOREIGN PATENT DOCUMENTS

| JP | 61034431 A * | 2/1986 | .............. G01K 7/20 |
| JP | S64-650 B2 | 1/1989 | |

(Continued)

*Primary Examiner* — Clayton E Laballe
*Assistant Examiner* — Leon W Rhodes, Jr.
(74) *Attorney, Agent, or Firm* — Posz Law Group, PLC

(57) ABSTRACT

A sensor driving device drives a sensor circuit formed of a Wheatstone bridge, which is connected between a main power supply for supplying a power supply potential and a reference power supply for supplying a reference potential lower than the power supply potential and includes at least one gauge resistor varying a resistance value thereof with deformation caused by external force. The sensor driving device includes a first resistor, which is connected in series with the sensor circuit between the main power supply and the sensor circuit, and a second resistor, which is connected between the sensor circuit and the reference power supply. The sensor driving device further includes a temperature output circuit connected in parallel to the sensor circuit relative to the main power supply. The temperature output circuit includes two output terminals, which output a potential difference smaller than a potential difference between one end of a main power supply side and one end of a reference power supply side.

18 Claims, 2 Drawing Sheets

(56) References Cited

U.S. PATENT DOCUMENTS

| | | | |
|---|---|---|---|
| 6,870,236 B2 * | 3/2005 | Johnson | G01L 9/06 |
| | | | 257/414 |
| 7,483,765 B2 | 1/2009 | Dick et al. | |
| 7,483,795 B2 * | 1/2009 | Miller | G01D 3/036 |
| | | | 340/612 |
| 7,862,228 B2 * | 1/2011 | Popilian | G01K 1/12 |
| | | | 374/136 |
| 8,701,460 B2 | 4/2014 | Krishna et al. | |
| 8,838,421 B2 | 9/2014 | Singh | |
| 9,429,479 B2 * | 8/2016 | Millar | G01L 1/2281 |
| 2001/0035758 A1 | 11/2001 | Furukawa | |

FOREIGN PATENT DOCUMENTS

| | | | |
|---|---|---|---|
| JP | 04307331 A | * | 10/1992 |
| JP | 2004-093321 A | | 3/2004 |

\* cited by examiner

SENSOR DRIVING DEVICE

CROSS REFERENCE TO RELATED APPLICATION

This application is based on and incorporates herein by reference Japanese patent application No. 2015-41627 filed on Mar. 3, 2015.

FIELD

The present disclosure relates to a sensor driving device for driving a sensor, which detects plural physical quantities.

BACKGROUND

Some sensors are used to detect plural physical quantities by detecting changes in output signals. Such sensors include, for example, a pressure sensor having a Wheatstone bridge, which is formed of gauge resistors (piezoelectric resistors) arranged on a diaphragm movable with pressure and the like. This pressure sensor outputs an output potential difference, which is variable with a quantity of deformation of the diaphragm caused by pressure, by using a change in a resistance value caused by deformation of the gauge resistors. It is thus possible to measure pressure applied to the pressure sensor by detecting the output potential difference.

The resistance value of a sensor circuit including the Wheatstone bridge also varies with temperature. That is, it is possible to measure temperature of an environment, in which the pressure sensor is located, based on the change in the resistance value of the Wheatstone bridge forming the pressure sensor.

In an exemplary system disclosed in U.S. Pat. No. 8,701,460 (patent document 1), when pressure is measured, an output potential difference is measured by supplying a resistor-forming part of a Wheatstone bridge with a predetermined power voltage and pressure is detected based on the output potential difference. On the other hand, when temperature is measured, an on-chip resistor is inserted between a power supply and the resistor-forming part and temperature is detected based on a potential at an intermediate node between the on-chip resistor and the resistor-forming part.

In the exemplary system disclosed in patent document 1, since a total resistance value varies between time of pressure measurement and time of temperature measurement and hence a current consumption of the power supply varies, the voltage of the power supply tends to vary among measurement time.

U.S. Pat. No. 7,483,765 (patent document 2) discloses an exemplary sensor, which is driven not to cause variation of current consumption. Although this sensor also includes a resistor element, which corresponds to an on-chip resistor used in patent document 1, the resistor element is not controlled to be present and absent. Alternatively, an input to an A/D converter is switched over between the pressure measurement time and the temperature measurement time. Thus variation of current consumption is suppressed.

In the sensor disclosed in patent document 2, however, the resistor element is connected in series to a resistor-forming part of a Wheatstone bridge. As a result, in comparison to the sensor driving system disclosed in patent document 1, a driving voltage of the sensor decreases and sensitivity in pressure detection decreases. When a resistance value of the resistor element is decreased to increase the sensitivity in pressure detection, a difference in input signal levels to the A/D converter increases between the pressure measurement time and the temperature measurement time. That is, a dynamic range of the input to the A/D converter need be increased. As a result, the A/D converter and subsequent circuits, which follow the A/D converter, need be large-sized and increase costs. En addition, the input level at the temperature measurement time becomes close to a power supply potential or a reference potential. As a result, leak currents of a multiplexer and switches, which are used to switch over the input signals to the A/D converter between a pressure signal and a temperature signal, tend to increase.

SUMMARY

It is therefore an object to provide a sensor driving device, which is capable of decreasing a difference between input levels to an analog front end circuit (AFE) including an A/D converter while improving sensitivity in physical quantity detection in detecting both of predetermined physical quantity and temperature.

A sensor driving device for driving a sensor circuit is formed of a Wheatstone bridge, which is connected between a main power supply for supplying a power supply potential and a reference power supply for supplying a reference potential lower than the power supply potential and includes at least one gauge resistor varying a resistance value thereof with deformation caused by external force. The sensor driving device comprises a first resistor connected in series with the sensor circuit between the main power supply and the sensor circuit, a second resistor connected between the sensor circuit and the reference power supply, and a temperature output circuit connected in parallel to the sensor circuit relative to the main power supply. The temperature output circuit includes two first output terminals, which output a potential difference smaller than a potential difference between one end of a main power supply side and one end of a reference power supply side.

DETAILED DESCRIPTION OF EMBODIMENT

Figure 1:
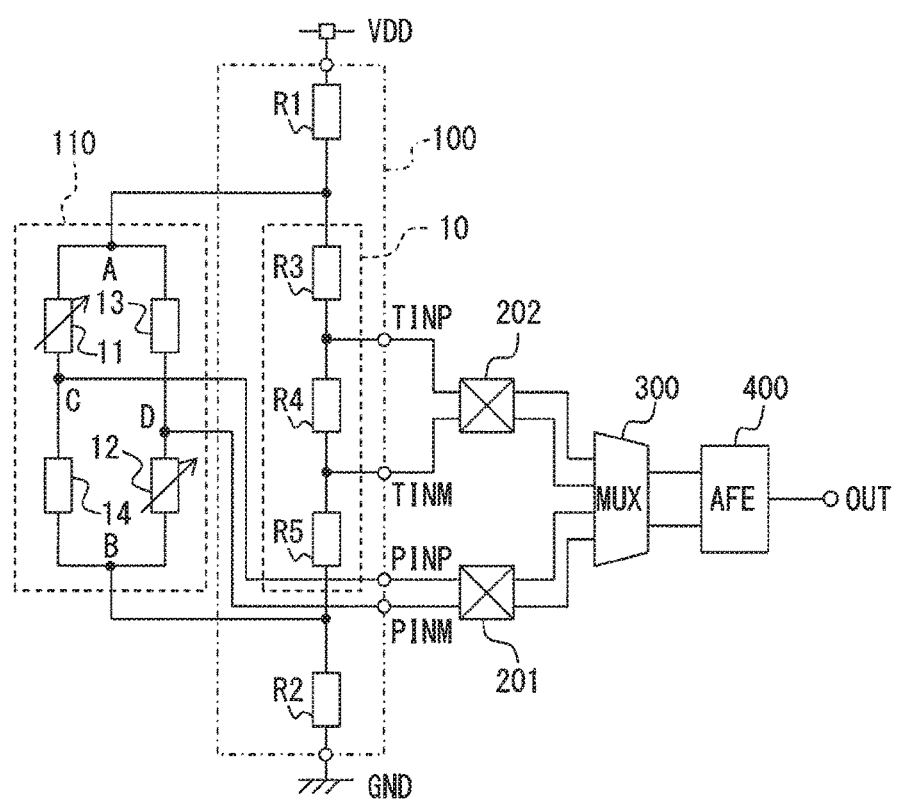
FIG. 1 is a circuit diagram showing a general configuration of a sensor driving device according to a first embodiment and its peripheral devices.

A sensor driving device will be described below with reference to the accompanying drawings, in which same or similar parts are designated with same reference numerals.

First Embodiment

Referring first to FIG. 1, a general configuration of a sensor driving device according to a first embodiment and its peripheral devices will be described.

As shown in FIG. 1, a sensor driving device 100 according to the first embodiment is provided for driving a pressure sensor, which is indicated as a sensor circuit 110 and located inside a flow passage of fluid, for example, and detects both pressure and temperature inside the flow passage. A detection object may be, for example, intake pressure, exhaust pressure and oil pressure in a vehicle. The sensor driving device 100 is connected to the sensor circuit 110 and includes a temperature output circuit 10, a first resistor RI and a second resistor R2.

The sensor circuit 110 is configured to form a Wheatstone bridge by two gauge resistors 11, 12 and two normal resistors 13, 14. Specifically, the gauge resistor 11 and the normal resistor 13 are connected in parallel relative to a high-potential-side terminal node A connected to a main power supply VDD through the first resistor R1. The gauge resistor 12 and the normal resistor 14 are connected in parallel relative to a low-potential-side terminal node B connected to a reference power supply GND, which is grounded, through the second resistor R2. Between the terminal node A and the terminal node B, the gauge resistor 11 and the resistor 14 are connected in series and the resistor 13 and the gauge resistor 12 are connected in series. The sensor circuit 110 has output terminals, one of which is connected to an intermediate node C between the gauge resistor 11 and the resistor 14 and indicated as PINP, and the other of which is connected to an intermediate node D between the resistor 13 and the gauge resistor 12 and indicated as PINM. The output terminals of the sensor circuit 110 are second output terminals, which are pressure output terminals. The intermediate nodes C and D are referred to as a terminal node C and a terminal node D, respectively.

Between the terminal node A and the terminal node B, a voltage V of a substantially constant level is supplied. This constant voltage V is defined by a power supply potential provided by the main power supply VDD and a reference potential provided by the reference power supply GND. Between the terminal node C and the terminal node D, a potential difference E is developed based on the voltage V and resistance values of the resistors 11 to 14 of the Wheatstone bridge.

When a pressure difference is applied between a top surface side and a bottom surface side of a diaphragm (not shown), the diaphragm deforms and distorts the gauge resistors 11 and 12. The resistance values of the gauge resistors 11 and 12 vary with this distortion, while the resistance values of the normal resistors are fixed. With a change in the resistance values, the potential difference E between the terminal nodes C and D changes by a quantity of change ΔE. That is, the potential difference between the output terminal PINP and the output terminal PINM varies with the quantity of change ΔE. Thus, the output terminal PINP and the output terminal PINM are output terminals to be used for pressure detection. The output voltage developed at each of the output terminal PINP and the output terminal PINM is inputted to an analog front end circuit 400 (referred to as AFE 400) through a first switch circuit 210 provided for chopping as described later. Each output voltage is amplified, if necessary, and converted into a digital value in the AFE 400 and outputted from an output terminal, which is indicated as OUT in FIG. 1. A pressure is calculated based on the digital value outputted as described above. The output voltage is chopped by the first switch circuit 201 in the first embodiment and hence it is demodulated in the AFE 400.

The first resistor R1 is interposed between the main power supply VOD and the sensor circuit 110. A resistance value of a resistor generally varies with temperature and hence it is preferred to select as the first resistor R1 a resistor, a resistance of which has low temperature dependency. Thus the voltage V between the terminal nodes A and B is adjusted to be less dependent on the temperature of the first resistor R1 and, as a result, each output voltage at the output terminal PINP and the output terminal PINM is adjusted to be less dependent on the temperature of the first resistor R1.

The second resistor R2 is interposed between the reference power supply GND and the sensor circuit 110. For the same reason as the first resistor R1, it is preferred to select as the second resistor R2 a resistor, a resistance of which has low temperature dependency.

The resistance values of the first resistor R1 and the second resistor R2 are set preferably to be smaller than that of the sensor circuit 110. With this setting of resistance values, the voltage V between the terminal nodes A and B is increased and the sensitivity of the sensor circuit 110 relative to distortion is improved.

The first resistor R1 and the second resistor R2 are set to have the same fixed resistance values each other. With this setting, a common mode potential of output voltages at the output terminal PINP and the output terminal PINM is set to be substantially intermediate between the power supply potential and the reference potential. Thus it is possible to process the pressure detection output by using the first switch circuit 201 and the input dynamic range of the AFE 100 as wide as possible.

The temperature output circuit 10 includes, as shown in FIG. 1, a third resistor R3, a fourth resistor R4 and a fifth resistor R5. The third resistor R3, the fourth resistor R1 and the fifth resistor R5 are connected in series in this order. One end of the third resistor R3, which is not connected to the fourth resistor R4, is connected to the terminal node A of the sensor circuit 110. One end of the fifth resistor R5, which is not connected to the fourth resistor R4, is connected to the terminal node B of the sensor circuit 110. That is, the temperature output circuit 10 and the sensor circuit 110 are connected to each other in parallel relative to the terminal node A and the terminal node B.

An output terminal TINP is set at an intermediate node between the third resistor R3 and the fourth resistor R4. An output terminal TINM is set at an intermediate node between the fourth resistor R4 and the fifth resistor R5. The output terminals of the temperature output circuit 10 provide first output terminals. The voltage V between the terminal nodes A and B depends on a combined resistance value of the sensor circuit 110. The combined resistance value of the sensor circuit 110 depends on the temperature of the environment, in which the sensor circuit 110 is placed. Thus the voltage between the terminal nodes A and B depends on temperature. The temperature and a quantity of its change are detected by detecting the voltage V and a quantity of its change ΔV.

In the first embodiment, an output voltage, which is determined by dividing the voltage V by a resistance value of the third resistor R3 and a combined resistance value of the fourth resistor R4 and the fifth resistor R5, is outputted from the output terminal TINP. An output voltage, which is determined by dividing the voltage V by a combined resistance value of the third resistor R3 and the fourth resistor R4 and a resistance value of the fifth resistor R5, is outputted from the output terminal TINM. When the temperature of the environment in which the sensor circuit 110 is placed changes, a potential difference occurs between the output terminal TINP and the output terminal TINM. Thus the output terminal TINP and the output terminal TINM forming the first output terminals are set as temperature detection terminals. Each output voltage of the output terminal TINP and the output terminal TINM is inputted to the AFE 400 through the second switch circuit 202 provided for chopping. Each output voltage is amplified, if necessary, and converted into a digital value in the AFE 400 and outputted from the output terminal, which is indicated as OUT in FIG. 1. A temperature is calculated based on the digital value outputted as described above. The output voltage is chopped by the second switch circuit 202 and hence it is demodulated in the AFE 400.

The third resistor R3 and the fifth resistor R5 are set to have the same resistance values each other. With this setting of resistance values, a common mode potential of output voltages at the output terminal TINP and the output terminal TINM is set to be substantially intermediate between the power supply potential and the reference potential. Thus it is possible to process the temperature detection output by using the second switch circuit 202 and the input dynamic range of the AFE 400 as wide as possible. Since it is possible to set each output voltage at the output terminal TINP and the output terminal TINM to be close to each output voltage of the output terminal PINP and the output terminal PINM, it is possible to perform A/D conversion in the pressure detection and the temperature detection by using one AFE 400 in common, the dynamic range of which is relatively narrow.

The circuit, which follows the sensor driving device 100 will be described next, As described above, the sensor driving device 100 according to the first embodiment performs its driving operation when the power supply voltage is supplied. The sensor driving device 100 has the output terminal PINP and the output terminal PINM as the second output terminals for pressure detection and the output terminal TINP and the output terminal TINM as the first output terminals for temperature detection.

As shown in FIG. 1, the output terminal PINP and the output terminal PINM for pressure detection are connected to the first switch circuit 201. The output terminal TINP and the output terminal TINM for temperature detection are connected to the second switch circuit 202.

The first switch circuit 201 and the second switch circuit 202 are configured to change the polarity of the DC output voltages in correspondence to a modulation signal, which is not shown. Specifically, for example, the input signal is outputted as it is when the modulation signal is a low-level signal "0," and the input signal is outputted after inversion of the polarity when the modulation signal is a high level signal "1." Each of the first switch circuit 201 and the second switch circuit 202 may be configured as a conventional chopper circuit. The first switch circuit 201 and the second switch circuit 202 are provided to reduce flicker noise and DC offset in the AFE 400 at the subsequent stage.

The output voltages of the output terminal PINP and the output terminal PINM are passed through the first switch circuit 201 and then applied the multiplexer 300 (referred to as MUX 300 below). The output voltages of the output terminal TINP and the output terminal TINM are passed through the second switch circuit 202 and then applied to the MUX 300.

The MUX 300 may be configured as a conventional multiplexer, which has four input terminals and two output terminals. That is, the MUX 300 outputs, as output signals, two signals out of four input signals, to the AFE 400. That is, the MUX 300 selects one of the output voltages of the output terminal PINP and the output terminal PINM and one of the output voltages of the output terminal TINM and the output terminal TINM and outputs the selected voltages to the AFE 400. As a result, since the voltages are applied through the MUX 300, the A/D conversion can be performed by one common AFE 400, the input dynamic range of which is relatively narrow, for both of the pressure detection and the temperature detection.

The operation and advantage of the sensor driving device 100 according to the first embodiment will be described below.

The sensitivity of pressure detection in the sensor circuit 110 formed of the Wheatstone bridge is proportional to the voltage V between the terminal nodes A and B. It is preferred to set the resistance values of the first resistor R1 and the second resistor R2 to be small as much as possible to increase the voltage V. In the conventional configuration, which is not provided with the temperature output circuit 10, the temperature is detected by setting terminals, which correspond to the terminal node A and the terminal node B, as output terminals. In this case, as the voltage V is set to be larger, the second switch circuit 202 and the input dynamic range of the AFE 400 are required to be enlarged. As a result, the circuit size and power consumption of the AFE 400 increases by necessity.

As opposed to the above-described conventional device, the sensor driving device 100 according to the first embodiment is provided with the temperature output circuit 10. Since the third resistor R3, fourth resistor R4 and fifth resistor R5, which form the temperature output circuit 10, are connected in series between the terminal nodes A and B in a manner to divide the voltage V by resistors, the output voltages at the output terminal TINP and the output terminal TINM can be reduced to be smaller than the voltage V between one end of the main power supply side and one end of the reference power supply side in the sensor circuit 110.

Thus, even in a case that the voltage V between the terminal nodes A and B in the sensor circuit 110 is set to be as large as possible to improve the sensitivity of the sensor circuit 110, the output voltages at the output terminal TINP and the output terminal TINM, which are the output terminals for temperature detection, can be reduced. Thus, when the output voltages of the sensor circuit 110 and the output voltages of the temperature output circuit 10 are applied to the AFE 400, a difference between the output voltage levels is reduced. As a result, even in a case that the AFE 400 is configured to have a relatively small input dynamic range, the ND conversion can be performed without overflow. Further, the leak current of subsequent circuits, which is caused by a large input level, can be reduced as well. In addition, both of the pressure detection and temperature detection can be performed by using one AFE 400 in common without taking any particular anti-leak current means.

In the first embodiment, since the output voltages of the output terminals TINP and the output terminal TINM are adjusted, the temperature detection sensitivity is decreased to be lower than in a case of no such adjustment. However, the pressure detection sensitivity can be increased by setting the voltage V to be larger. The circuit size and power consumption required for the AFE 400 at the subsequent stage to attain a desired accuracy is determined by the detection sensitivity of either the pressure or temperature, whichever is lower. For this reason, in a case that a sensor, the pressure detection sensitivity of which is lower than that of the temperature detection sensitivity, is used, the circuit size and power consumption of the AFE 400 can be decreased by increasing the pressure detection sensitivity. For this reason, as far as the temperature detection sensitivity is equal to or higher than the pressure detection sensitivity, a lowered temperature detection sensitivity is tolerable.

The temperature changes with time generally more slowly than the pressure changes with time. In such a case, even in a case that the temperature detection sensitivity is set to be lower than the pressure detection sensitivity, the decrease of the temperature detection sensitivity can be compensated by signal processing such as removal of noise components in the temperature detection at the AFE 400 or subsequent stages. For this reason, the pressure detection sensitivity can be increased by setting the voltage V so that the temperature detection sensitivity is lower than the pressure detection sensitivity. In many cases, the temperature detection accuracy is allowed to be lower than the pressure detection accuracy. In such a case, the pressure detection sensitivity can be increased by setting the voltage V so that the temperature detection sensitivity is lower than the pressure detection sensitivity.

The resistance value of the third resistor R3 and the combined resistance value of the fourth resistor R4 and the fifth resistor R5 are preferably set to be larger than the resistance values of the first resistor R1 and the second resistor R2. In the first embodiment, the resistance value of the third resistor R3, and the resistance values of the fourth resistor R4 and the fifth resistor R5 are set to be larger than those of the first resistor R1 and the second resistor R2, respectively. The resistance value of the third resistor R3 and the combined resistance value of the fourth resistor R4 and the fifth resistor R5 are set to be larger than the resistance value of the sensor circuit 110. With this resistance value setting, the current, which flows through the temperature output circuit 10 in a current path from the main power supply VDD to the reference supply GND, can be limited and hence the power consumption at the time of temperature detection can be decreased. The decrease in the temperature detection sensitivity caused by the current flowing through the temperature output circuit 10 can be decreased.

The resistance values of the first resistor R1 and the second resistor R2 are set to be smaller than that of the sensor circuit 110, the voltage V between the terminal nodes A and B can be increased as much as possible and the sensitivity to the distortion of the sensor circuit 110 can be improved.

In the first embodiment, the resistance values of the first resistor R1 and the second resistor R2 are equal to each other and the resistance values of the third resistor R3 and the fifth resistor R5 are equal to each other. With this resistance value setting, the common mode potential of the output voltages related to the pressure and temperature becomes substantially the intermediate value between the power supply potential and the reference potential. As a result, when the object of detection is switched over between pressure and temperature, the change of the common mode potential can be almost eliminated. With the common mode potential, which is set to be substantially intermediate between the power supply potential and the reference potential, the input and output dynamic ranges of subsequent amplifiers and the AFE 400 can be used fully thereby improving the power consumption, implementation area and noise performance.

Second Embodiment

Figure 2:
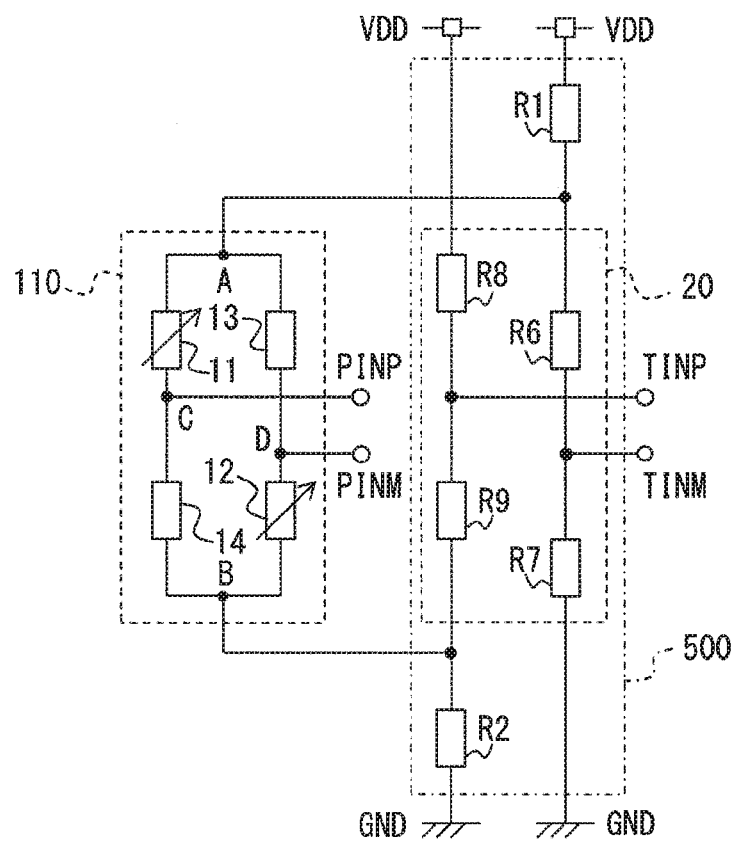
FIG. 2 is a circuit diagram showing a general configuration of a sensor driving device according to a second embodiment.

In the sensor driving device 100 exemplified in the first embodiment, the temperature output circuit 10 is formed of three resistors R3, R4 and R5 connected in series between the terminal nodes A and B of the sensor circuit 110. A sensor driving device 500 in a second embodiment includes a temperature output circuit 20 as shown in FIG. 2.

The sensor circuit 110 and other subsequent circuits, which are the first and second switch circuits 201, 201, MUX 300 and AFE 440 and other than the temperature output circuit 20, are structurally the same as those in the first embodiment and hence are not described. Further, the other circuits, which are provided at an output side of the temperature output circuit 20, that is, subsequent to the temperature output circuit 20, are not shown in FIG. 2.

Specifically, in the second embodiment, the temperature output circuit 20 has a sixth resistor R6 and a seventh resistor R7 as well as an eighth resistor R8 and a ninth resistor R9.

The sixth resistor R6 and the seventh resistor R7 are connected in series in this order between the terminal node A of the sensor circuit 110 and the reference power supply GND. An intermediate node between the sixth resistor R6 and the seventh resistor R7 is used as the output terminal TINM.

The eighth resistor R8 and the ninth resistor R9 are connected in series in this order between the main power supply VDD and the terminal node B of the sensor circuit 110. An intermediate node between the eighth resistor R8 and the ninth resistor R9 is used as the output terminal TINP.

In the sensor driving device 500 according to the second embodiment, an output voltage at the output terminal TINP is not affected by the potential at the terminal node A. The output voltage at the output terminal TINP is determined by the potential of the terminal node B and resistance values of the eighth resistor R8 and the ninth resistor R9. The resistance values of the eighth resistor R8 and the ninth resistor R9 may be determined arbitrarily. As a result, the output voltage at the output terminal TINP can be adjusted more flexibly than in the first embodiment.

Similarly, in the sensor driving device 500, the output voltage at the output terminal TINM is not affected by the potential of the terminal node B. The output voltage at the output terminal TINM is determined by the potential of the terminal node A and resistance values of the sixth resistor R8 and the seventh resistor R7. The resistance values of the sixth resistor R6 and the seventh resistor R7 may be determined arbitrarily. As a result, the output voltage at the output terminal TINM can be adjusted more flexibly than in the first embodiment.

Similarly to the first embodiment, the resistance values of the first resistor R1 and the second resistors R2 are preferably set to be smaller than that of the sensor circuit 110. With this setting of resistance values, the voltage between the terminal nodes A and B can be increased as much as possible and hence the sensitivity to the distortion of the sensor circuit 110 can be increased.

The resistance value of the seventh resistor R7 is preferably set to be larger than that of the sixth resistor R6. The resistance value of the eighth resistor R8 is preferably set to be larger than that of the ninth resistor R9. With this setting of resistance values, the sensitivity to a change in the resistance value caused by a change in the temperature of the sensor circuit 110 can be improved. That is, the sensitivity relative to temperature can be improved.

It is further preferred that the resistance values of the first resistor R1 and the second resistor R2 are set to be equal to each other, the resistance values of the seventh resistor R7 and the eighth resistor R8 are set to be equal to each other and the resistance values of the sixth resistor R6 and the ninth resistor R9 are set to be equal to each other. With this setting of resistance values, similarly to the first embodiment, the common mode potential of the output voltages relative to pressure and temperature can be set to be substantially at the intermediate value between the power supply potential and the reference potential.

Other Embodiment

The sensor driving device is not limited to the preferred embodiments described above but may be implemented differently with various modifications.

In each of the embodiments described above, it is preferred that, when the output voltage related to pressure is smaller than the output voltage related to temperature, a signal amplifier circuit for amplifying the output voltage related to pressure is provided between the first switch circuit 201, which is connected to the output terminal PINP and the output terminal PINM, and the MUX. The output voltage outputted from the sensor circuit 110 is smaller than the output voltage related to temperature in many cases. By amplifying the output voltage related to pressure by the signal amplifier circuit, a signal inputted to the AFE 400 can be increased to a signal amplitude, which makes the resolution of A/D conversion to be used more effectively.

In each of the embodiments described above, the switch circuits 201, 202 and the MUX 300 are shown as separate blocks. However, those circuits may be formed as one circuit block, which performs the same functions. The switch circuits 201 and 202 may be configured as one switch circuit, which is used in common to detect pressure and temperature at the output side of the MUX 300.

The switch circuits 201 and 202 may be replaced with chopper-stabilized amplifiers. The chopper-stabilized amplifier is effective to reduce influence of an offset and flicker noise by its internal chopping function. However, the amplifier generally causes offset variation because of a change in an input signal level. For this reason, when the chopper-stabilized amplifier having a wide input signal level range is used, a circuit area and power consumption tend to increase and a residual offset also tends to increase. Since the sensor driving device according to each embodiment is effective to reduce a range of the output related to temperature, the circuit area and power consumption of the chopper-stabilized amplifier can be reduced. Further since the output voltage of pressure and the output voltage of temperature can be made close to each other, one chopper-stabilized amplifier, which is shared for pressure detection and temperature detection can be provided at the output side of the MUX 300 in a small circuit area and low power consumption.

In each of the embodiments described above, the AFE 400 is provided in common for pressure detection and temperature detection. However, the AFE 400 may be provided individually for each detection. In this case, the MUX 300 need not be provided.

What is claimed is:

1. A sensor driving device for driving a sensor circuit formed of a Wheatstone bridge, which is connected between a main power supply for supplying a power supply potential and a reference power supply for supplying a reference potential lower than the power supply potential and includes at least one gauge resistor varying a resistance value thereof with deformation caused by external force, the sensor driving device comprising:
a first resistor connected in series with the sensor circuit between the main power supply and the sensor circuit;
a second resistor connected between the sensor circuit and the reference power supply; and
a temperature output circuit connected in parallel to the sensor circuit relative to the main power supply,
wherein the temperature output circuit includes two first output terminals, which output a potential difference smaller than a potential difference between one end of a main power supply side and one end of a reference power supply side.

2. The sensor driving device according to claim 1, wherein:
the temperature output circuit includes a third resistor, a fourth resistor and a fifth resistor connected in this order between an intermediate node, which is between the first resistor and the sensor circuit, an intermediate node, which is between the sensor circuit and the second resistor; and
an intermediate node between the third resistor and the fourth resistor and an intermediate node between the fourth resistor and the fifth resistor form the first output terminals.

3. The sensor driving device according to claim 2, wherein:
a combined resistance value of the third resistor, the fourth resistor and the fifth resistor is larger than each resistance value of the first resistor and the second resistor.

4. The sensor driving device according to claim 2, wherein:
each resistance value of the first resistor and the second resist smaller than a resistance value of the sensor circuit.

5. The sensor driving device according to claim 2, wherein:
each resistance value of the first resistor and the second resistor is smaller than a resistance value of the sensor circuit; and
a combined resistance value of the third resistor, the fourth resistor and the fifth resistor is larger than the resistance value of the sensor circuit.

6. The sensor driving device according to claim 1, wherein:
the temperature output circuit includes a sixth resistor and a seventh resistor connected in this order between an intermediate node, which is between the first resistor and the sensor circuit, and the reference power supply;
the temperature output circuit further includes an eighth resistor and a ninth resistor connected in this order between the main power supply and an intermediate node between the sensor circuit and the second resistor; and
an intermediate node between the sixth resistor and the seventh resistor and an intermediate node between the eighth resistor and the ninth resistor form the first output terminals.

7. The sensor driving device according to claim 6, wherein:
a resistance value of the seventh resistor is larger than a resistance value of the sixth resistor; and
a resistance value of the eighth resistor is larger than a resistance value of the ninth resistor.

8. The sensor driving device according to claim 6, wherein:
the each resistance value of the first resistor and the second resistor is smaller than the resistance value of the sensor circuit.

9. The sensor driving device according to claim 6, wherein:
the each resistance value of the first resistor and the second resistor is smaller than the resistance value of the sensor circuit;

a combined resistance value of the sixth resistor and the seventh resistor is larger than the resistance value of the sensor circuit; and a combined resistance value of the eighth resistor and the ninth resistor is larger than the resistance value of the sensor circuit.

10. The sensor driving device according to claim 1, wherein:
the first output terminals of the temperature output circuit and second output terminals of the sensor circuit are connected to an analog front end circuit through a multiplexer.

11. The sensor driving device according to claim 10, wherein:
the first output terminals and the second output terminals are connected to the multiplexer through a switching circuit, which performs a chopping operation.

12. The sensor driving device according to claim 11, wherein:
a signal amplifier circuit is provided between the switch circuit, which is connected to at least the second output terminals, and the multiplexer.

13. The sensor driving device according to claim 3, wherein:
each resistance value of the first resistor and the second resistor is smaller than a resistance value of the sensor circuit.

14. The sensor driving device according to claim 3, wherein:
each resistance value of the first resistor and the second resistor is smaller than a resistance value of the sensor circuit; and
a combined resistance value of the third resistor, the fourth resistor and the fifth resistor is larger than the resistance value of the sensor circuit.

15. The sensor driving device according to claim 4, wherein:
each resistance value of the first resistor and the second resistor is smaller than a resistance value of the sensor circuit; and
a combined resistance value of the third resistor, the fourth resistor and the fifth resistor is larger than the resistance value of the sensor circuit.

16. The sensor driving device according to claim 7, wherein:
the each resistance value of the first resistor and the second resistor is smaller than the resistance value of the sensor circuit.

17. The sensor driving device according to claim 7, wherein:
the each resistance value of the first resistor and the second resistor is smaller than the resistance value of the sensor circuit;
a combined resistance value of the sixth resistor and the seventh resistor is larger than the resistance value of the sensor circuit; and
a combined resistance value of the eighth resistor and the ninth resistor is larger than the resistance value of the sensor circuit.

18. The sensor driving device according to claim 8, wherein:
the each resistance value of the first resistor and the second resistor is smaller than the resistance value of the sensor circuit;
a combined resistance value of the sixth resistor and the seventh resistor is larger than the resistance value of the sensor circuit; and
a combined resistance value of the eighth resistor and the ninth resistor is larger than the resistance value of the sensor circuit.

* * * * *